Oct. 26, 1926.

G. MORGAN

TRANSMISSION DEVICE

Filed May 28, 1923 — 2 Sheets-Sheet 1

1,604,297

Witnesses:
W. J. Kilroy
Henriette Mertz

Inventor:
Guy Morgan

By Brown, Boetticher & Dienner
Attys

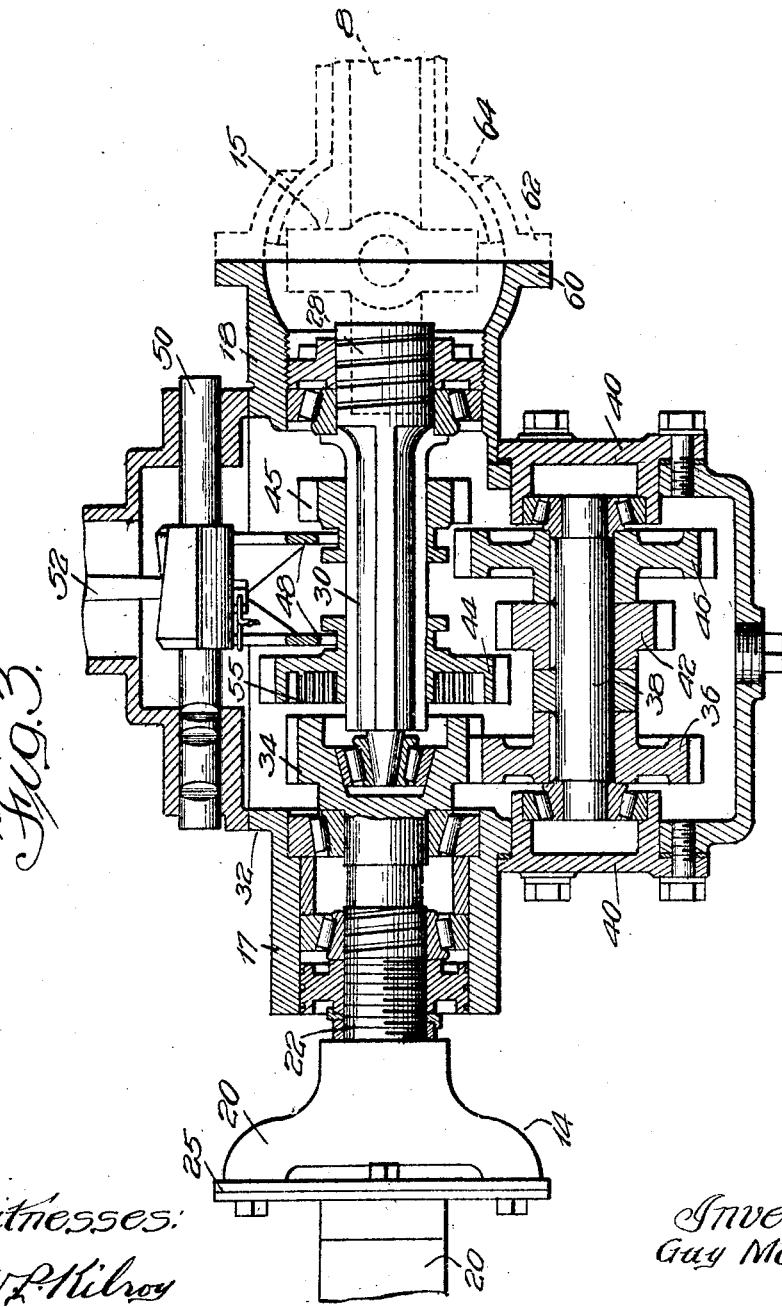

Patented Oct. 26, 1926.

1,604,297

UNITED STATES PATENT OFFICE.

GUY MORGAN, OF NEW YORK, N. Y., ASSIGNOR TO THE WARFORD CORPORATION, OF NEW YORK, N. Y., A CORPORATION OF NEW YORK.

TRANSMISSION DEVICE.

Application filed May 28, 1923. Serial No. 642,148.

My invention relates to auxiliary transmissions for motor vehicles and the like.

Where an auxiliary transmission is employed it has been customary in the prior art arrangements with which I am familiar to support same by attachment to the casing of the main transmission when interposed between the main transmission and the propeller shaft or by attachment to the differential casing when disposed at that point or to other of the drive or transmission encasing means.

I find in such arrangements that the torque and other driving stresses imposed upon the drive or transmission encasing parts is objectionable. Where the auxiliary transmission is attached to and supported by the main transmission, the main transmission and the connections between it and the auxiliary transmission as subjected to the torque and other driving stresses due to the transmission of the drive to the rear axle. This is especially objectionable where a power take-off connection from the auxiliary transmission is desired.

My present invention aims to relieve the drive and transmission encasing parts more specifically the main transmission and connections between it and the auxiliary transmission where the auxiliary transmission is interposed between the main transmission and the propeller shaft of the stresses incident to the transmission of the drive to the rear axle or other means driven from the main transmission.

Another aim is to facilitate installation of the auxiliary transmission and to improve the resulting assembly. In accordance therewith I support the auxiliary transmission upon the vehicle chassis preferably upon the main frame or a suitable auxiliary or subframe. Between the main and auxiliary transmissions I interpose a universal connection which permits flexing therebetween, and also ready accommodation of the shafts and connections between the main and auxiliary transmissions to any wear or disalignment in assembly, yet at the same time does not attach or provide a supporting connection between the main and auxiliary transmissions. A second universal connection between the auxiliary transmission and the propeller shaft permits flexing and relative movement between the rear axle and the auxiliary transmission.

The chief advantages of my present invention reside in relieving the main transmission and other drive or transmission encasing parts of the driving stresses due to the transmission of the drive from the engine to the rear axle and in permitting relative movement between the rear axle and the auxiliary transmission and accommodation of the shaft and connections between the main and auxiliary transmissions to wear and disalignment in assembly without attaching or providing a supporting connection therebetween. Attachment of the auxiliary transmission to the vehicle frame instead of to the main transmission permits a strong construction and makes installation easier.

Numerous other advantages and adaptations of the invention will be apparent from the following detailed description of the preferred form of the same.

Fig. 3 is a vertical longitudinal section on line 3—3 of Fig. 1.

Figure 1:
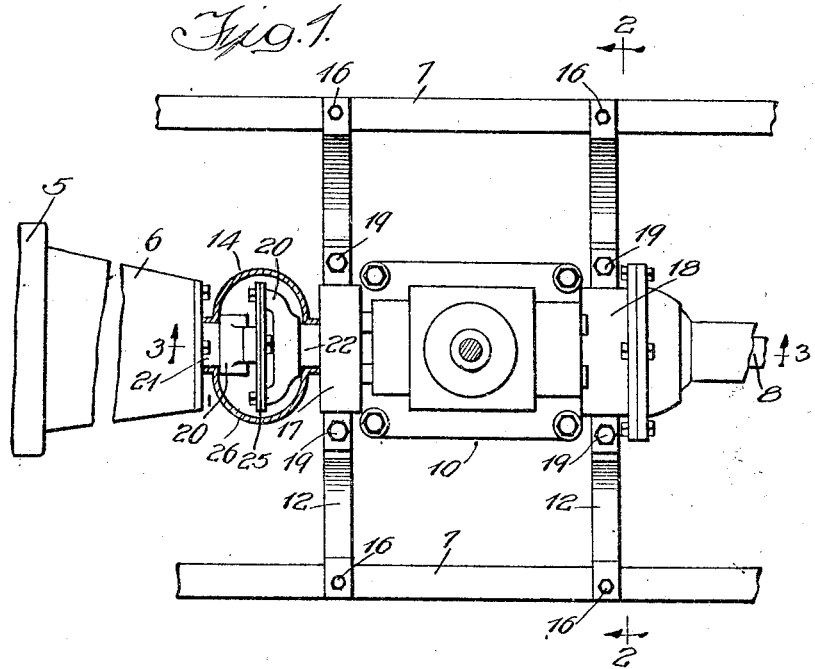
Figure 1 is a plan view of a motor vehicle chassis of the "Ford" type showing an embodiment of my present invention in connection therewith.
Figure 2:
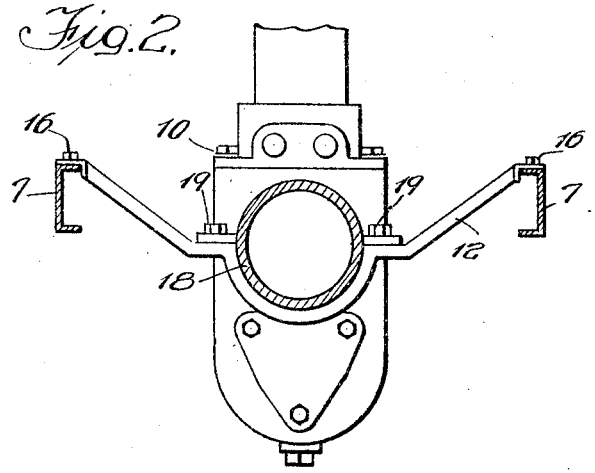
Fig. 2 is a transverse section on line 2—2 of Fig. 1.

In the embodiment of the invention selected for illustration 5 designates fragmentarily the engine or power plate of a vehicle of the "Ford" type, 6 the main or original transmission at the rear or propeller shaft end of engine 5, 7—7 the longitudinally extending side members of the vehicle frame and 8 the propeller shaft through which the drive is transmitted through the differential and rear axle to the drive wheels.

In applying the auxiliary transmission designated 10 in accordance with my present invention, space for reception of same is provided between the forward or engine end of propeller shaft 8 and main transmission 6. A universal connection 14 is provided at the propeller shaft end of transmission 6 and a second universal connection 15 is provided at the engine end of propeller shaft 8. Auxiliary transmission 10 is supported between universal connections 14 and 15 independently of main transmission 6 by supporting cross member 12—12 spanning side members 7—7 of the main frame. The opposite ends of supporting members 12—12 rest upon and are secured to side members 7—7 as by bolts 16.

The casing of auxiliary transmission 10 has a forwardly extending tubular projection 17 and a coaxial rearwardly extending tubular projection 18 which tubular projections in the present instance rest upon supporting members 12—12 and are secured thereto by bolts 19. Universal connection 14 is shown as comprising the usual fabric or yielding disc type consisting of a pair of yoke members 20—20 secured upon the rear end of main drive shaft 21 of main transmission 6 and upon the forward end of stub shaft 22 of the auxiliary transmission for rotation with said shaft respectively. Yoke members 20—20 are connected through fabric or other suitable discs 25, and the universal connection is preferably enclosed in a boot of leather 26 or other suitable enclosure.

The universal connection 14 which I have shown and described is merely illustrative. It may be of the type in which connection is had through studs arranged at right angles to each other or of any other suitable types. Whether it be of the type shown or any other suitable or preferred type said universal simply provides a driving connection between the main and auxiliary transmissions. The auxiliary transmission is not supported or mounted through said universal nor is it attached to the main transmission casing therethrough. Cross members 12—12 rigidly mount the auxiliary transmission on side members 7—7 of the main frame. Universal 14 permits flexing and relative movement between the main and auxiliary transmission without impairing the driving connection therebetween also ready accommodation of the shafts and connections between the main and auxiliary transmissions to wear in the bearings or other parts of the two devices. The flexibility of the drive is increased and misalignment in assembly is permitted without binding or subjecting any of the parts to uneven or excessive wear.

The torque reaction of the auxiliary transmission due to the transmission of the drive therethrough is taken up by cross arms 12—12 and the main frame supporting same and the main transmission and connections between it and the auxiliary transmission are relieved of said torque and torque reaction and all other driving stresses that would be imposed if the casing of the auxiliary transmission were mounted or attached to the casing of the main transmission. Stronger and heavier construction of the auxiliary transmission especially the case thereof, is permitted and installation is facilitated. If desired a sub-frame may be provided for rigidly supporting the auxiliary transmission independently of the main transmission instead of mounting same directly upon side members 7—7 of the main frame of the vehicle.

Universal connection 15 between the propeller end of auxiliary transmission 10 and the engine end of propeller shaft 8 has a forwardly projecting stud 28 which engages in an angular socket in stub-shaft 30 to connect shafts 8 and 34 for rotation together. Universal 15 may be as shown or of the fabric disc or any other suitable type. It permits the necessary flexing for example upon relative movement between the rear axle and the frame which supports the auxiliary transmission.

The details of the auxiliary transmission per se between stub shafts 22 and 30 are substantially the same as more fully set out in my copending application Serial No. 588,744 filed Sept. 18, 1922. Shaft 22 is rotatably mounted in suitable bearings arranged in tubular extension 17 of auxiliary transmission casing 32 and is provided at its inner end with a gear or pinion 34 formed integral therewith. Shaft 30 is rotatably mounted at its rear end in a bearing member mounted in tubular extension 18 and at its forward end in a bearing member arranged in recessed inner face of pinion 34.

Pinion 34 constantly meshes with a gear 36 fixed upon a counter shaft 38 arranged parallel to shaft 30 and rotatably mounted at its opposite ends in bearings arranged in removable plugs 40—40 mounted in coaxial opening in casing 32. Fixed upon counter shaft 38 is a reduction gear 42 into and out of mesh with which a cooperating reduction gear 44 splined for movement along shaft 30 is adapted to be moved. A second gear 45 splined upon shaft 30 for longitudinal movement therealong is adapted for movement into and out of mesh with the third gear 46 fixed on counter-shaft 38. Gears 44 and 45 are shifted by shifting members 48 depending from shifting rods 50 and actuated by a suitable lever 52. Gears 44 in addition to being formed for engagement with gear 42 is recessed and provided with an internal toothed clutch 55 which is adapted to clutch pinion 34 to connect stub shafts 22 and 34 rotation together.

In operation when internal toothed clutch 55 is in clutch pinion 34 and shafts 22 and 30 thereby connected for rotation together the power from the present adopted "Ford" transmission 6 can be imparted to the rear axle through the same speed ratios as heretofore. Such ratios are limited commonly to two speeds forward and one reverse. By shifting internal teeth of gear 44 out of mesh with pinion 34 and the external teeth of said gear into mesh with gear 42 and under-drive or stepping down of the speed at the auxiliary transmission is secured. With the speed thus stepped down transmission 6 is again operable to secure a low or high stepped down driving ratio. By shifting gear 44 into the position shown between gears 34 and 42 and gear 45 into mesh with gear 46 the driving rotio is stepped up or an over drive secured and transmission 6 is again operable to secure a high or low stepped up or over drive. The reverse of transmission 6 is of course operable in either the direct or the over-drive or under-drive position of the auxiliary transmission gearing giving where desired three different reverse driving ratios.

The rear end of rearwardly projecting tubular extension 18 partially encases universal joint 15 and terminates in a flange 60 which is adapted to be bolted to flange 62 of a casing 64 enclosing joint 15.

The features of supporting the auxiliary transmission independently of the main transmission specifically upon the vehicle frame, the provision of a universal driving connection between the main and auxiliary transmissions for permitting accommodation to wear and also permitting flexing between the main and auxiliary transmissions and misalignment in assembly and the interposition of the auxiliary transmission between a pair of universal connections at the engine end of the propeller shaft are highly important aspects of my invention.

These featuures are especially advantageous where a power take-off such as disclosed in my copending application, Serial No. 612,349 filed Jan. 12, 1923 is employed.

The invention is not limited to the details of the particular system nor to the details of the particular auxiliary transmission shown and described.

I claim:—

1. In combination, a frame, a pair of cross members extending transversely across the frame and each supported at its opposite ends on the frame, a main transmission mounted forwardly of both said cross members, an auxiliary transmission having a lower counter-shaft enclosing part depending below and suspended between said cross members, generally coaxial tubular projections at the forward and rear ends of the auxiliary transmission above said suspended part, one supported upon each of said cross members between the ends thereof, a universal joint connection between the main and auxiliary transmissions forwardly of both said cross members, and a propeller shaft extending rearwardly from the auxiliary transmission and having universal joint connection with the rear end of said auxiliary transmission.

2. In combination, a frame, a pair of cross members extending transversely across the frame and each supported at its opposite ends on the frame, a main transmission mounted forwardly of both said cross members, an auxiliary transmission having a tubular projection at its forward end supported upon one of said cross members between the ends thereof, a generally coaxial tubular projection at the opposite end of the auxiliary transmission and supported upon the other of said cross members between the ends thereof, a universal joint connection between the main and auxiliary transmissions, and a propeller shaft extending rearwardly from the auxiliary transmission and having universal joint connection with the rear end of said auxiliary transmission.

In witness whereof, I hereunto subscribe my name, this 25 day of May, 1923.

GUY MORGAN.